United States Patent [19]
Lande et al.

[11] 4,300,362
[45] Nov. 17, 1981

[54] ARTICULATION FOR MANIPULATOR ARM

[75] Inventors: Maurice A. Lande, Paris; Roger J. P. David, Ballancourt, both of France

[73] Assignee: Association des Ouvriers en Instruments de Precision, Paris, France

[21] Appl. No.: 76,812

[22] Filed: Sep. 19, 1979

[30] Foreign Application Priority Data

Sep. 20, 1978 [FR] France .................. 78 26928
Aug. 2, 1979 [FR] France .................. 79 19845

[51] Int. Cl.³ .............................................. F16D 3/26
[52] U.S. Cl. ...................................... 64/17 R; 64/19; 64/12; 414/1
[58] Field of Search .................. 64/19, 17 R, 1 C, 12, 64/2 P, 23; 414/1, 7

[56] References Cited
U.S. PATENT DOCUMENTS 3,411,324 11/1968 Federline ........................ 64/19
3,924,420 12/1975 Falk ............................... 64/17 R
4,107,948 8/1978 Molaug ............................ 64/19

FOREIGN PATENT DOCUMENTS 422580 9/1974 U.S.S.R. ........................ 414/1
524684 11/1976 U.S.S.R. ........................ 414/1

OTHER PUBLICATIONS

P. M. Degroat, "Remote Control Device", IBM Technical Disclosure Bulletin, Jun. 1962, vol. 5, No. 1, p. 17.

Primary Examiner—Charles J. Myhre
Assistant Examiner—Magdalen Moy
Attorney, Agent, or Firm—Karl F. Ross

[57] ABSTRACT

An articulation for a manipulation arm at one end of which a tool, e.g. a spray gun, is to be mounted has two supporting elements such as plates or rings which are intercoupled by connecting rods, and joints between the connecting rods and the supporting elements have at least two degrees of freedom. A preferred number of rods is three, and two of the joints may be pivotally mounted to one of the supporting element but a third is non-rotatably mounted. By independent angular driving of two of the coupling rods a wide range of articulation displacements may be caused as between the supporting elements and hence communicated to a tool mounted on one of them. Furthermore the attitude of the tool about an axis perpendicular to the ring may be controlled by a rotatable drive rod linking pivots disposed centrally of each supporting element.

5 Claims, 4 Drawing Figures

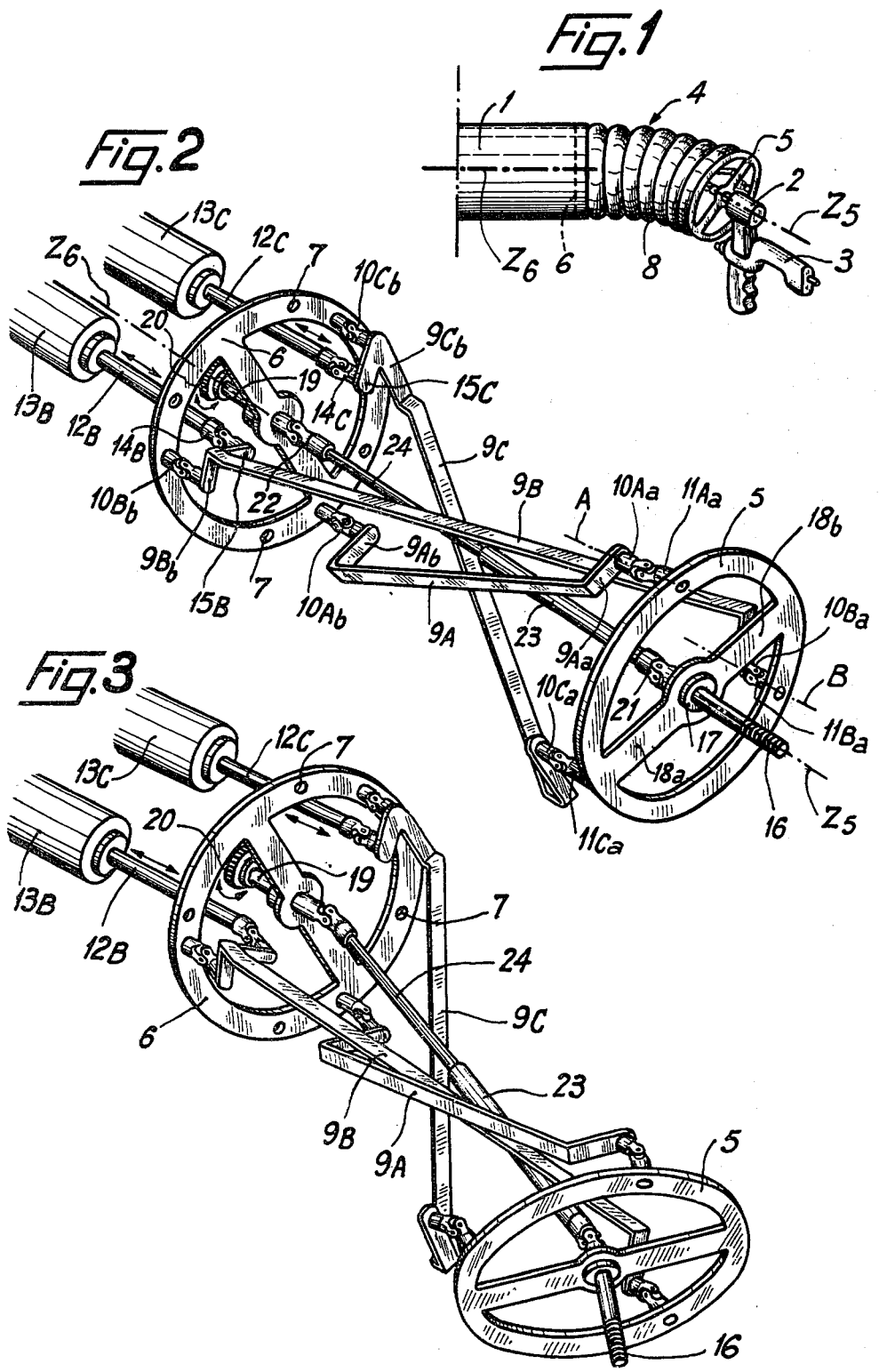

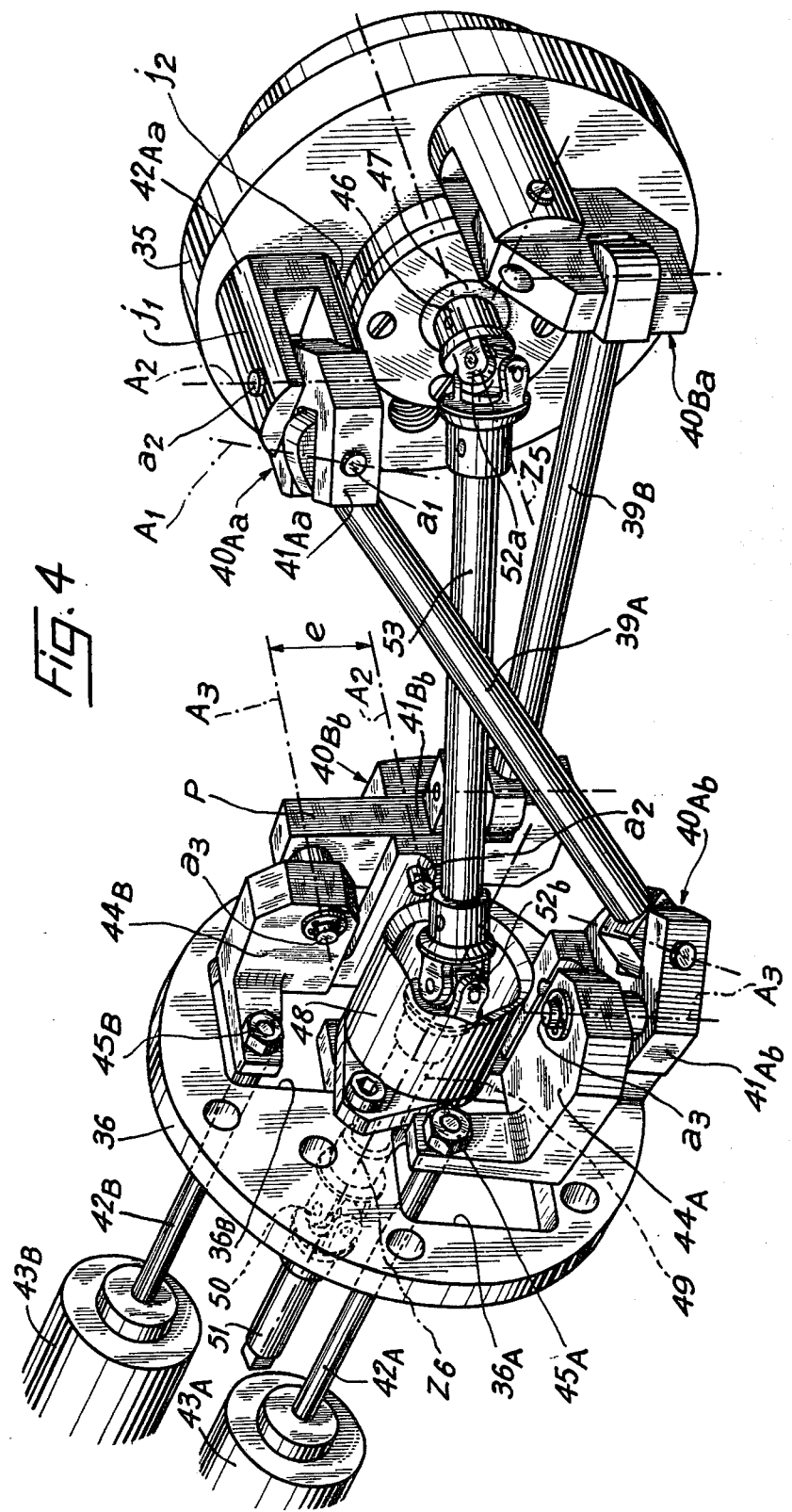

ARTICULATION FOR MANIPULATOR ARM

FIELD OF THE INVENTION

The present invention relates to an articulation for a manipulator arm.

BACKGROUND OF THE INVENTION

Automatic manipulators are used in many technical contexts. They have at least one arm having at its end a tool support. Means are provided to displace this—usually rigid—arm in different movements; it is often necessary to couple the tool support with the end of the rigid arm by means of an articulation, allowing the tool to be given very varied orientations in relation to the longitudinal axis of the rigid arm.

An articulation for a manipulator arm is already known, which is able to have wide-ranging movements, but which, having a complicated structure, is costly and unreliable; this known articulation is of sort essentially made up of sort of "vertebrae" articulated with each other; one can see that the driving of such an articulation, for the automatic control of the orientation of the tool, requires means that are complex and difficult to create.

OBJECT OF THE INVENTION

It is an object of the invention to provide an articulation for a manipulator arm having a very simple robust and lowcost structure allowing a wide range of movements.

SUMMARY OF THE INVENTION

The articulation for a manipulator arm according to the present invention comprises two supporting elements, for example plates or rings, interlinked by at least two connecting rods, the ends of which are coupled with the supporting elements by joints with two degrees of freedom. It is essential for the supporting element that they offer reaction points for the connecting rods which are spaced apart in a single plane; a plate or ring is clearly suitable.

Because of the simplicity of its structure, the articulation for a manipulator arm according to the present invention can easily be driven; to control the displacement of the first ring relative to the second, two control rods, for example two piston rods can be placed in such a way as to freely pass through the second ring, and drive respectively, by means of joints with two degrees of freedom, elbow attachments at the corresponding ends of two of the connecting rods.

In addition, in one embodiment of the articulation according to the present invention, the first ring has at its center a tool support mounted on a first pivot coaxial with and passing through the plane of the first ring, a rotatable piston rod drives a second pivot coaxial with and carried by the second ring at its center, and the first and second pivots are coupled to each other by means of two Cardan (universal) joints and at least one rod so as to control rotations of the tool support about the axis of the first ring.

BRIEF DESCRIPTION OF THE DRAWING

FIG. 1 is a general perspective view of a manipulator arm to which a tool and its support are joined and including an articulation embodying the present invention;

FIGS. 2 and 3 show the internal structure of the articulation shown in FIG. 1, for two different positions of the tool relative to the manipulator arm; and FIG. 4 shows another embodiment of the invention.

SPECIFIC DESCRIPTION

In FIG. 1, the end of the rigid arm of a manipulator, for example a painting robot is shown at 1. This arm 1 is made, for example, of a metallic tube, inside which are arranged different control members, which will be described in detail later. A support 2, to which is fixed to a paint spraygun 3 of a known type, is coupled to the end of the arm 1 of the manipulator by means of an articulation 4 according to the present invention. This articulation 4 according to the present invention comprises a first ring 5 (see also FIGS. 2 and 3), at the middle of which is mounted the support 2 of the gun 3, a second ring 6 which is fixed in the open end of the tubular arm 1, for example by means of bolts engaged in appropriate bores (7 in FIGS. 2 and 3) of the ring 6, and a deformable sleeve 8 whose ends are fixed by appropriate means to the opposing faces of the rings 5 and 6. This deformable sleeve 8 is only to protect the mechanical members of the articulation 4, which can be seen in FIGS. 2 and 3.

As can be seen in FIGS. 2 and 3, the two rings 5 and 6 of the articulation according to the present invention are interlinked by three connecting rods, 9A, 9B and 9C, the ends of which are elbowed, (for example at $9Aa$ and $9Ab$ for connecting rod 9A), and are coupled respectively with rings 5 and 6 by six universal joints. It can clearly be seen for example in FIG. 2 that the elbowed ends $9Aa$ and $9Ab$ of connecting rod 9A are coupled respectively with first and second rings 5 and 6 by the first and second Cardan or universal joints $10Aa$ and $10Ab$.

According to another feature of the invention, supports, $11Aa$ and $11Ba$, of two of the three Cardan (or first) joints, associated with the ring 5 of the articulation 4, are mounted on the said ring 5 so as to be able to pivot about the axes A and B respectively, which are substantially parallel to the axis $Z_5$ of the first ring 5. In contrast, the support $11C_a$ of the third Cardan joint $10Ca$ associated with the same ring 5, is fixed rigidly, by appropriate means onto the said ring 5. The same goes for the supports of the three Cardan joints or second joints, $10Ab$ to $10Cb$, which are fixed on the second ring 6.

In order to control the displacement of the ring 5 relative to the ring 6, two control rods, for example rods 12B and 12C of two hydraulic jacks, 13B and 13C, go through the tubular arm 1 (where the jacks 13B and 13C may be mounted) and also extend through the ring 6; the ends of the said control rods, 12B and 12C, drive respectively, by means of the Cardan joints 14B and 14C, the elbowed attachments, 15B and 15C, of the corresponding ends $9Bb$ and $9Cb$ of the two connecting rods 9B and 9C.

The tool support 2 (FIG. 1) is fixed on a first pivot 16, which is mounted to rotate about the axis $Z_5$ of ring 5 in a bearing 17, itself supported, at the center of the ring 5, for example, by two radial arms $18a$ and $18b$. A second pivot 19 is mounted in the same fashion in the middle of the ring 6, coaxially with its axis $Z_6$. The end of this second pivot 19, which is at the side of the ring 6 opposite the articulation 4, and consequently inside the tubular arm 1, is coupled rotationally, by appropriate means, for example by a pinion 20, with a rotational control member, for example the shaft of a rotating jack (not shown). The ends of the first and second pivots, 16 and 19, which are directed towards each other, i.e. towards the inside of articulation 4, are coupled together by means of two Cardan or universal joints (i.e. third joints) 21 and 22, and two telescopic rods 23 and 24. More specifically the Cardan joint 21 is disposed between the inside end of the first pivot 16 and the corresponding end of the hollow rod 23, while the Cardan joint 22 is disposed between the inside end of the second pivot 19 and the corresponding end of the rod 24, the other end of which is mounted to slide freely in the hollow rod 23. The assembly 20-19-22-24-23-21-16 makes up a same-speed joint, by means of which a rotation through any angle of the shaft of the rotating jack (not shown) is transmitted to the support 2 of the spraygun 3 in the form of a rotation of the same angle of the said support 2 about the axis $Z_5$ of the ring 5.

As can be seen by comparing FIGS. 2 and 3, the translational movements of the two jack rods 12B and 12C in parallel to the axis $Z_6$ of the ring 6 control displacement of the ring 5 relative to the said ring 6, by means of the three connecting rods 9A to 9C and the six Cardan joints associated with their respective ends. These displacements of the ring 5, carrying the spraygun 3 and its support 2, allow the axis of the said support (axis $Z_5$ of ring 5) and consequently the direction in which the gun 3 is facing, to be given in a freely chosen orientation in relation to that of the axis, $Z_6$, of the arm 1 of the manipulator; one degree of additional freedom is obtained by making the spraygun 3 and its support 2 pivot on the first pivot 16 (i.e. about the axis $Z_5$), thanks to the rotating jack driving the pinion 20. This articulation permits a wide range of movement to the gun 3 and its support, particularly when the articulation is provided with Cardan joints which themselves have a wide rage of angular movement in their articulation.

The articulation shown in FIG. 4 has a first plate 35, in the middle of which can be mounted for example the support for a paint spraygun, and a second plate 36, which can be fixed in the open end of a tubular arm, as illustrated in FIG. 1. The two plates 35 and 36 are interlinked by two connecting rods, 39A and 39B, the ends of which are coupled to the plates 35 and 36, by four joints, each having two pivots with noncoincident axes; it can be seen clearly, for example, that the ends of the connecting rod 39A are coupled respectively with the plates 35 and 36 by the joints 40A$a$ and 40A$b$. Each of the four joints 40A$a$ to 40B$b$ has a mobile fork, for example 41A$a$, mounted on the end of the corresponding connecting rod 39A, so as to pivot about a first axis, A1; the mobile fork 41A$a$ is itself mounted in a bearing 42A$a$, fast with the corresponding plate 35, in such a way as to pivot about a second axis A2 which is not coincident with the first axis A1 but is substantially orthogonal to it. The bearing of each joint, such as 42A$a$ has a fixed fork of which the base is fast with the corresponding plate 35, and of which the two prongs j1 and j2, extend in a direction substantially parallel to that of the axis A2, $Z_5$, of the said plate 35; the geometric axis of pivoting is therefore determined by a stub shaft a2, the middle part of which goes through the mobile fork 41A$a$, and the ends 01 which are engaged respectively in the two prongs, j1 and j2, of the fixed fork 42A$a$; as the stub shaft a2 is perpendicular to the prongs, j1 and j2, of the fixed fork 42A$a$, its geometric axis A2 is orthogonal to the geometric axis $Z_5$ of the circular plate 35. As for the first pivoting axis, A1, of the joint 40A$a$, it is determined by a stub shaft a1, the middle part of which goes through the corresponding widened end of the connecting rod 39A, and the ends of which are engaged in the corresponding bores in the two prongs of the mobile fork 41A$a$; as the median planes of the respective slits in the mobile fork 41A$a$ and the fixed fork 42A$a$ are substantially perpendicular to each other end to the two pivoting axes A1 and A2 respectively, the latter are of course orthogonal to each other. The joints 40B$a$, 40A$b$ and 40B$b$ have similar make-ups, which it is not necessary to describe in detail.

According to another characteristic of the invention, in order to control the displacement of the first plate, 35, relative to the second plate, 36, two control rods, 42A and 42B, for example the rods of two jacks 43A and 43B, are arranged in such a way as to extend substantially in the direction of the axis $Z_6$ of the said second plate 36, and to cross the latter freely through the appropriate holes, for example rectangular windows, 36A and 36B. These jack rods, 42A and 42B, drive respectively, by their ends, the mobile fork 41A$b$ of the joint 40A$b$ and an extension P of the mobile fork 41B$b$ of the joint 40B$b$. In fact, each jack rod, 42A or 42B, is coupled to the mobile fork of the corresponding joint by means of an elbowed part 44A or 44B; one of the two legs of each elbowed part, for example 44A, is fastened to the free end of the corresponding jack rod, 42A, for example by a bolt 45A, whilst the other leg of the same elbowed part, 44A, is mounted pivottingly on the mobile fork, 41A$b$, of the corresponding joint, 40A$b$, by means of a stub shaft a3, the geometric axis of which A3, is likewise orthogonal to the axis z6 of the second plate 36, and parallel to the second pivoting axis of the mobile fork 41A$b$ (designated by A2 for the mobile fork 41A$a$), These two parallel pivoting axes are not merged, but have a predetermined spacing, which is shown at e in the case of the joint 40B$b$.

As in the embodiment illustrated in FIGS. 2 and 3, the tool support (not seen in FIG. 4), is fixed onto a first pivot 46, which is mounted to rotate about the axis $Z_5$ of the plate 35, in a bearing 47, itself going through the central part of the said plate 35. A second pivot, 49 is mounted in the same way, in a bearing 48, in the middle of the plate 36, coaxial with its axis $Z_6$. The end of this second pivot 49, which on the side of the plate 36, opposite to the articulation, is coupled rotationally, by means of a Cardan joint, 50, and an axle, 51, with a rotational control member, for example the shaft of a rotary jack, or with another rotary driver (not shown).

The ends of the first and second pivots, 46 and 49, which are directed towards each other, i.e. towards the inside of the articulation, are intercoupled by means of two Cardan joints, 52$a$ and 52$b$, and a rigid rod, 53. In contrast to the embodiment shown in FIGS. 2 and 3, this rigid rod 53 is not telescopic. The assembly 51-50-49-52$b$-53-52$a$-46 makes up a same-speed joint, by means of which a rotation, through any angle, of the shaft of the rotation jack (not shown) is transmitted to the tool support in the form of a rotation, through the same angle, of the said support about the axis $Z_5$ of the plate 35.

The operation of the articulation for manipulator arm which has just been described is similar to that of the embodiment illustrated in FIGS. 2 and 3.

The articulation for manipulator arm according to the present invention is able to assume other embodiments, all remaining within the scope of the invention. In the case of the embodiment shown in FIGS. 2 and 3, the number and arrangement of those of the six Cardan joints, associated with the two rings 5 and 6, the supports of which are mounted on the said rings in such a way as to be able to pivot, are optional matters. The same goes for the arrangement on the periphery of each of the rings 5 and 6, of the supports of the three Cardan joints which are associated with it in the embodiment shown in FIGS. 2 and 3, the supports of the three Cardan joints associated with a same ring, 5 or 6, are arranged substantially at the apices of an equilateral triangle; by way of variation, these could be arranged at the apices of a right-angled isosceles triangle or a triangle of another shape. In the case of the embodiment shown in FIG. 4, the arrangment, on the periphery of each of the plates 35 and 36 of the corresponding joints, for example 40A*a* and 40B*a*, is also an optional matter; however the two joints are preferably arranged, as illustrated, at the ends of an arc of about 90 degrees. The embodiments of the bearing of each of the forks 41A*a* and 41B*b* is an optional matter, likewise its method of fixing on the corresponding plate, 35 or 36. The method of coupling the end of each jack or drive rod with the mobile fork of the corresponding joint is a matter of choice. Instead of having a mobile fork, each of the joints 40A*a* and 40B*b* can be of another known type, having two pivots with noncoincident axes. Instead of being controlled by jacks or equivalent drivers, control members such as 12B, 12C, and 20 (FIG. 2) can be actuated by hand, by means of a system of connecting rods, or of cables sliding in fixed sheaths, in a matter known per se; these latter embodiments can obviously only be used to control movement of relatively light tools. The pivotal mounting of the support 2 of the tool and the control means of its pivotings are optional. Finally, the articulation according to the present invention can be used equally well without control members, motorized or manual, especially, when the tool, for example the gun 3, must be guided directly by the hand of the operator, the articulation 4 acting then only to link it permanently to a control or feed arm. In the latter case, if a heavy tool is being used, the effort of the operator can be lightened by a device similar to that illustrated in FIGS. 2 and 3, and previously described, but in which the cylinders 13B and 13C correspond to dampeners, for example hydraulic ones, made the right size to balance the weight of the articulation and of the tool. With the latter arrangement, when the operator lets go of the tool, the latter is held in the position which it previously occupied. A similar dampening can be provided for the rotation of the support 2 of the tool on its pivot 16.

The articulation according to the present invention can be adapted to the arm of a manipulator of any sort, for example a painting robot, a flame cutter or a welding robot . . . etc. In addition it can not only be inserted between the end of the arm, and the tool support (like a wrist), but can also be inserted between two rigid parts of a single arm (like an elbow) or even between a rigid arm and its fixed support (like a shoulder).

What we claim is:

1. An articulation for a manipulator arm comprising: first and second spaced apart flat supporting elements;
three connecting rods extending between said first and second elements;
respective first universal joints each connecting one end of a respective one of said rods to said first supporting element, said first joints being spaced apart on said first supporting element;
respective second universal joints connecting the opposite ends of said rods respectively to said second supporting element at spaced apart location thereon whereby said rods and said universal joints link said supporting elements together, said second supporting element being formed with apertures and two of said rods at said opposite ends thereof having elbow-shaped extensions; and
a pair of control rods adapted to be connected to respective linear drives and having ends provided with respective third universal joints each connected through a respective one of said apertures to a respective one of said elbow-shaped extensions whereby said first supporting element is displaced relative to said second supporting element upon linear movement of said control rods.

2. An articulation for a manipulator arm comprising:
first and second spaced apart flat supporting elements;
at least two connecting rods extending between said first and second supporting elements;
respective first universal joints each connecting one end of a respective one of said rods to said first supporting elements at locations spaced apart thereon;
respective second universal joints connecting opposite ends of said rods respectively to said second supporting element at locations spaced apart thereon whereby said rods and said universal joints link said supporting elements together;
a first pivot extending through and substantially perpendicular to said first supporting element;
a second pivot extending through and substantially perpendicular to said second supporting element;
means for interconnecting said pivots including a coupling member having a pair of further universal joints each connected to one of said pivots and disposed between said supporting elements;
means for rotating said second pivot; and
means for mounting a tool support on said first pivot whereby said tool support is rotated upon rotation of said second pivot.

3. The articulation defined in claim 1 wherein said member is a telescopingly extensible and contractible rod.

4. An articulation for a manipulator arm comprising:
first and second spaced apart flat supporting elements;
at least two connecting rods extending between said first and second supporting elements;
respective first universal joints connecting respective ends of said rods to said first supporting element at spaced apart locations thereon;
respective second universal joints connecting at opposite ends of said rods respectively to said second supporting element whereby said rods and said universal joints link said supporting elements together, said second supporting element having a pair of apertures formed thereon, said second universal joints each having a fork member mounted on the respective said opposite end of a connecting rod for pivotal movement about a first axis and being rotatable on said second supporting element about a second axis noncoincident with said first axis; and respective control rods traversing said apertures and connected to respective lineal drives and engaging the respective fork members for displacing said first supporting element relative to said second supporting element upon actuation of said drives.

5. The articulation defined in claim 4 wherein said control rods are each connected to the respective fork member by an elbow-shaped member pivotally connected to the respective fork member.

* * * * *